United States Patent [19]

Cowling

[11] Patent Number: 4,497,712
[45] Date of Patent: Feb. 5, 1985

[54] ABSORBENT PILLOW

[75] Inventor: Albert R. Cowling, Rosemont, Pa.

[73] Assignee: Geotech Development Corporation, King of Prussia, Pa.

[21] Appl. No.: 541,924

[22] Filed: Oct. 14, 1983

[51] Int. Cl.³ ............................................. E02B 15/04
[52] U.S. Cl. .................................. 210/691; 210/769; 210/924; 210/242.4; 210/282
[58] Field of Search .................. 210/924, 923, 242.3, 210/776, 777, 808, 799, 484, 691, 242.4, 282, 289, 769

[56] References Cited

U.S. PATENT DOCUMENTS

| | | | |
|---|---|---|---|
| 3,617,564 | 11/1971 | Hooren | 210/924 |
| 3,617,566 | 11/1971 | Oshima et al. | 210/242.4 |
| 3,739,913 | 6/1973 | Bogosian | 210/242.4 |
| 3,988,932 | 11/1976 | Baier et al. | 210/925 |
| 4,111,813 | 9/1978 | Preus | 210/924 |
| 4,401,447 | 10/1983 | Huber | 210/484 |
| 4,419,236 | 12/1983 | Hsu | 210/282 |

*Primary Examiner*—John Adee
*Attorney, Agent, or Firm*—Seidel, Gonda & Goldhammer

[57] ABSTRACT

An expendable pillow in the form of a container having at least one pocket partially filled with a granular absorbent material is disclosed. The container is a fabric of high permeability coated with a surfactant. The granular material is highly absorbent and expandable upon contact with liquids. The pillow is light weight, has an absorption capacity in excess of 500%, and will float on liquids.

16 Claims, 3 Drawing Figures

ABSORBENT PILLOW

BACKGROUND OF THE INVENTION

There is a need for an inexpensive light weight, highly efficient absorbent pillow which will absorb hydrocarbons, chemical spills, and the like in small ponds, lagoons, and in connection with hydrocarbon handling equipment. There is a need for such a product which is simple and easy to use without creating a disposal problem.

BRIEF SUMMARY OF THE INVENTION

The present invention is directed to apparatus for absorbing liquids such as liquids which constitute an environmental problem. The apparatus is preferably in the form of an expendable pillow. The pillow is in the form of a container having at least one pocket partially filled with a granular absorbent material. The container is preferably a fabric of high permeability coated with a surfactant. The granular material is highly absorbent and expandable upon contact with liquids.

The object of the present invention is to provide a solution to environmental problems wherein there is a need to remove hydrocarbons and other chemicals in a localized area by way of apparatus which is simple, inexpensive, and easy to use without creating any complications for disposing of the pillow.

Other objects and advantages of the present invention will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
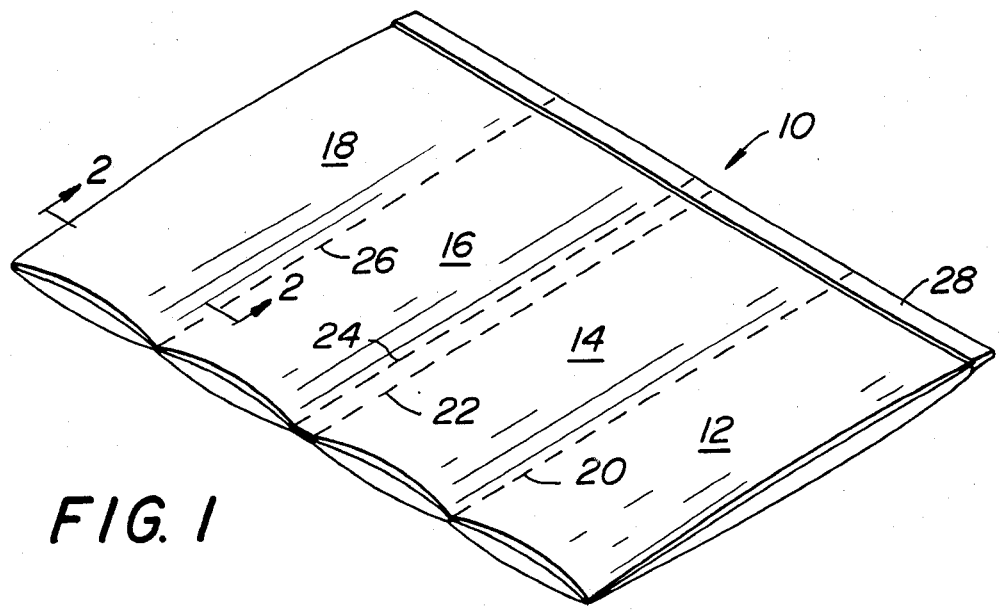
FIG. 1 is a perspective view of a first embodiment of a pillow in accordance with the present invention.
Figure 2:
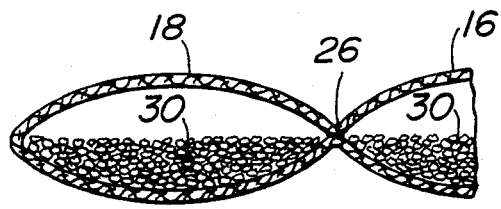
FIG. 2 is a sectional view taken along the line 2—2 in FIG. 1 but on an enlarged scale.

Referring to the drawing in detail, wherein like numerals indicate like elements, there is shown in FIG. 1 a first embodiment of the present invention wherein a pillow is designated generally as 10. The pillow 10 may include a plurality of pockets such as pockets 12, 14, 16 and 18.

Pockets 12 and 14 are delineated by way of a line of stitching 20. Pockets 14 and 16 are delineated by a pair of parallel lines of stitching 22 and 24. Pockets 16 and 18 are delineated by a line of stitching designated 26. The container is closed on its sides and at its bottom. A filler 30 partially fills each pocket. Thereafter, the container is closed by applying stitching to a hem 28 at the open end of the container.

The container is preferably made from a non-woven fabric having high permeability to liquids. The preferred material is spun bonded nylon having high resistance to tearing, high resistance to rot and mildew, and having a weight of approximately one ounce per square yard. Fabric of the type preferred herein is commercially available from Monsanto (trademark). The spun bonded nylon fabric is preferably treated with a commercially available surfactant.

The filler is preferably a cellulosic organic material such as corn cobs which have been ground into granules. Corn cob materials are well-known for use in pipes, as a fuel, as a fertilizer, etc. It has been ascertained that ground-up corn cob has an absorbent capacity of 500% while being light in weight such as 14 pounds per cubic foot.

The corn cob granules are produced by milling and screening so as to attain uniform granules virtually free of dust. A typical composition of such granules is:

| lignin | 5% |
| moisture | 8–10% |
| protein | 2.5% |
| fat | .5% |
| ash | 1.5% |
| cellulose | balance |

The granules are free of solvents, resins, acids, preservatives, etc.

The pillow 10 preferably has dimensions suitable for easy handling such as a height of 17 inches and a length of 24 inches. The pockets 12 and 18 preferably have a width of about 6 inches while the pockets 14 and 16 have a width of about 5½ inches. The strip between stiching 22 and 24 has a width of about 1 inch. Pillow 10 may be easily separated into a pair of discrete pillows by cutting with scissors between the lines of stitching 22 and 24. Each of the pockets is preferably filled with about one-half pound of granules of corn cobs.

The thusly described pillow has a weight of about two pounds. The pillow 10 having the size and weight set forth above is capable of easy handling for application to spills of oils or other materials in a localized area such as on the floor, on the surface of a pond or lagoon, on the surface of a river wherein the spill has been circumscribed by a boom, etc. The filler 30 quickly absorbs the liquids upon contact and has an absorbent capacity in excess of 500%. As the filler 30 absorbs the liquid, it expands and fills up the remainder of the pockets. A pillow 10 having an initial weight of about two pounds can have a final weight of about 15 pounds when the filler 30 has absorbed the liquid to its capacity. The pillow 10 is expendable. When the pillow 10 has been used to absorb a hydrocarbon such as oil, kerosene, and the like, it may be utilized by a utility company or other type of company as fuel in a furnace. Thus, the entire pillow after absorbing a liquid is burnable with less than two percent ash. Alternatively, the pillow may be used as land fill.

The container is preferably made from a spun material which has resistance to rot and mildew and high resistance to tearing. The preferred resistance to tearing results from the manner in which the pillows are dispensed onto the liquid to be absorbed. Thus, it is contemplated that dispensing of the pillows will not be accomplished by hand but may be accomplished by mechanical means including dispensing pillows by means of a pitchfork or other device which will puncture the fabric.

Figure 3:
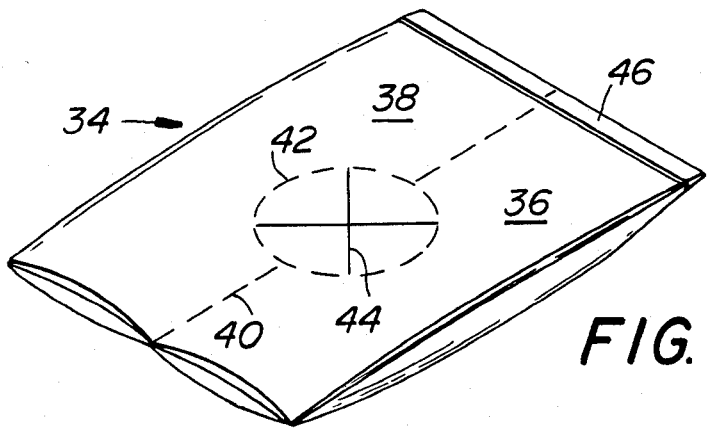
FIG. 3 is a perspective view of a pillow in accordance with a second embodiment in the present invention.

In FIG. 3, there is illustrated a second embodiment of the present invention which is identical with that described above except as will be made clear hereinafter. The pillow 34 includes pockets 36 and 38 delineated by a line of stitching 40 extending from a closed end of the container to a hem 46 at the open end of the container. Each pocket contains a filler 30 as described above. The line of stitching 40 extends from diametrically opposite points on a circular line of stitching 42. Within the line of stitching 42, there is no filler. The top and bottom panels of the container within the circular line of stitching 42 are cut so as to provide a plurality of slits 44.

The pillow 34 is particularly adapted for use at joints between conduits. For example, fuel oil and other hydrocarbons are delivered to gas stations throughout the country by way of a truck. The underground tanks at a gas station are filled by way of a conduit connected at one end of the truck and connectable at its other end to an inlet conduit for the underground tanks. If the conduits are not connected in a tight manner, it is possible for the hydrocarbons to leak at the joint and thereby provide a potential hazard on the pavement around the inlet conduit to the underground tanks. The pillow 34 is particularly adapted for use in connection with such a joint. The slits 44 spread apart as the pillow 34 is applied to the inlet conduit to the underground tanks at a gas station. Any leakage will be immediately absorbed by the pillow 34.

The pillows of the present invention are preferably floatable on water, hydrocarbons, and other chemicals. If desired, rocks, sand, or other material may be added to control the specific gravity of the pillow so that it will decend to a predetermined depth for selective absorption. It is within the scope of the present invention to delineate the pockets into smaller zones, each partially filled. Thus, it will be noted that the present invention provides a simple, inexpensive, and efficient solution to a problem involving environmental spills as compared to others which provide very sophisticated and technically complex solutions for such problems.

The present invention may be embodied in other specific forms without departing from the spirit or essential attributes thereof and, accordingly, reference should be made to the appended claims, rather than to the foregoing specifications, as indicating the scope of the invention.

I claim:

1. Apparatus for absorbing liquids from a surface which constitute an environmental problem comprising an expendable pillow, said pillow being the form of a container having at least three discrete pockets side by side, each pocket being only partially filled with an organic granular absorbent material occupying not more than about 50% of the volume of each pocket, said container being made from a non-woven synthetic fiber, said container having high permeability and being coated with a surfactant, said granular material having an absorption capacity in excess of 300% so that it may expand on contact with liquids and fill the pockets, the weight of the pillow before use being less than four pounds, said pockets being delineated by means joining opposite faces of said container, said means including a pair of spaced joints between said opposite faces of said container so that said container can be separated by cutting the container between said joints.

2. Apparatus in accordance with claim 1 wherein said pillow has a density of not more than about 15 pounds per cubic foot so that it may float on liquids.

3. Apparatus in accordance with claim 1 wherein said granular absorbent material is ground corn cobs free of dust.

4. Apparatus in accordance with claim 1 wherein said weight of the pillow is approximately two pounds.

5. A container in accordance with claim 1 wherein said material has a density of approximately fourteen pounds per cubic foot.

6. Apparatus in accordance with claim 1 wherein said container is made from spun bonded synthetic material having high resistance to tearing, rot and mildew and having a weight of approximately one ounce per square yard.

7. Apparatus for absorbing liquids including chemical solutions and hydrocarbons on a non-selective basis comprising an expendable pillow, said pillow including a container having a plurality of pockets, each pocket being only partially filled with a granular absorbent organic material capable of absorbing said liquids and expandable on contact with said liquids to fill the remainder of the pockets, said material having a density of not more than fifteen pounds per cubic foot, and said container being a non-woven synthetic fabric coated with a surfactant such that said fabric has a high permeability.

8. Apparatus in accordance with claim 7 wherein said granular material is corn cobs.

9. Apparatus in accordance with claim 7 wherein said fabric is spun bonded nylon.

10. Apparatus in accordance with 7 wherein said pillow has a weight of not more than about four pounds.

11. A method of cleaning up an environmental problem involving a spillage of hydrocarbons comprising the steps of contacting the hydrocarbons with an expendable pillow made from a non-woven synthetic fabric of high permeability and having a plurality of pockets each partially filled wih granular absorbent material having an absorption capacity in excess of 300% and a density of about fourteen pounds per cubic foot, said material including corncob granules free of dust, expanding said material as it absorbs hydrocarbons which pass through said fabric and causes said material to fill the pockets, and then disposing of the pillow.

12. A method in accordance with claim 11 including disposing of the pillows as fuel or land fill.

13. A method in accordance with claim 11 including using a pillow having a plurality of discrete pockets each partially filled with said corn cob granules with the total weight of the pillow being about 4 pounds.

14. A method in accordance with claim 11 including floating said pillow on said spillage.

15. A method of cleaning up an environmental problem involving a spillage of liquids comprising the steps of contacting the liquid spillage with a floatable pillow made from a non-woven synthetic fabric of high permeability, providing said pillow with a plurality of discrete pockets each only partially filled with granular corn cob material having an absorption capacity in excess of 300 percent and a density of about fourteen pounds per cubic foot, expanding said material as it absorbs liquid spillage which passes through said fabric and causes said material to fill the pillow pockets, then disposing of the pillow in a non-polluting manner.

16. Apparatus for absorbing liquids from a surface which constitute an environmental problem comprising an expendable pillow, said pillow being in the form of a container having a plurality of pockets being only partially filled with an organic granular absorbent material occupying not more than about 50% of the volume of each pocket, two pockets being separated by stitching, said stitching including a circular area lacking said granular absorbent material and with the fabric being slit within the circular area so that the pillow may circumscribe an annular conduit adapted to extend through the circular area, said container being made from a non-woven synthetic fiber, said container being coated with a surfactant such that said container has a high permeability, said granular material having an absorption capacity in excess of 300% so that it may expand on contact with liquids and fill the pockets, the weight of the pillow before use being less than four pounds.

* * * * *